Patented Mar. 6, 1951

2,543,837

UNITED STATES PATENT OFFICE 2,543,837

ALPHA-AMMOMETHYL, ALPHA-AMINO ARALIPHATIC ACIDS

Gustav Ehrhart, Frankfort-on-the-Main, Germany, assignor to Farbwerke Hoechst vormals Meister Lucius & Bruning, Frankfort-on-the-Main, Germany No Drawing. Application April 25, 1949, Serial No. 89,574. In Germany January 4, 1949

3 Claims. (Cl. 260—518)

The present invention relates to alpha-ammomethyl, alpha-amino araliphatic acids.

I have found that substituted ethylene diamines can be made by hydrogenating a compound of the general formula:

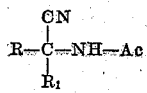

in which R stands for an aliphatic or araliphatic radical, $R_1$ stands for a carbmethoxy or carbethoxy group or a hydrogen atom and Ac represents an acetyl or phenyl acetyl group. The acyl group and, if desired, the ester group may be eliminated by hydrolysis after the hydrogenation is complete.

If it is desired to make alpha, beta-diamino acids, the acylaminocyanacetic esters obtained, for example, by acid reduction of isonitrosocyanacetic esters and acylation of the amino compounds formed in this operation by means of phenylacetic acid chloride or acetyl chloride, are hydrogenated and the compounds so obtained and corresponding to the general formula:

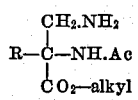

are hydrolyzed with mineral acids.

If, however, substituted ethylene diamines free from carboxyl groups are to be prepared, the ester group is suitably hydrolyzed and carbon dioxide is split off, for instance, by heating after acidification. The compounds so obtained and corresponding to the general formula

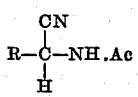

are then hydrogenated, and finally the acyl group is split off by heating with a mineral acid, such as hydrobromic acid.

The alpha,beta-diamino-carboxylic acids may themselves be used as medicinals, and the substituted ethylene diamines serve, for instance, as intermediate products for the preparation of medicinals.

The following examples serve to illustrate the invention, but they are not intended to limit it thereto:

1. 4.6 grams of sodium are dissolved in 80 cc of methyl alcohol. 46.4 grams of phenylacetylaminocyanacetic acid methyl ester and 25 grams of benzyl chloride are then added. The mixture is boiled for about 1 hour under reflux, as the result of which the alkaline reaction disappears. Water is added and the phenylacetylaminobenzyl-cyanacetic acid methyl ester, which precipitates in the form of crystals, is separated by filtering with suction. 43.5 grams of the product are then heated on the steam bath together with 200 cc of a 2n-solution of sodium hydroxide until a clear solution is obtained. 220 cc. of 2n-hydrochloric acid are then added, and the mixture is heated for 4–5 hours on the steam bath until the evolution of carbon dioxide has ceased. The separation of the phenylacetylamino-benzylacetic acid nitrile formed is completed by the addition of sodium carbonate solution. The product obtained corresponds to the following formula:

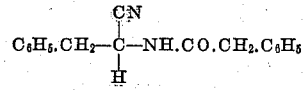

28 grams of the compound so obtained are dissolved in ten times that quantity of isopropyl alcohol, and the solution is hydrogenated at 70° C. with Raney nickel. After the calculated quantity of hydrogen has been taken up, the nickel is separated by filtering with suction, and the isopropyl alcohol is distilled under reduced pressure. The residue is boiled for 3 hours under reflux together with 75 cc. of hydrobromic acid of 46 per cent strength, twice the quantity of water is added, and the phenylacetic acid which has separated is extracted by agitation with ether. The aqueous extract solution is evaporated nearly to dryness, mixed with concentrated sodium hydroxide solution, and the base so formed is extracted with ether. After the distillation of the ether, the 1,2-diamino-3-phenyl-propane corresponding to the formula:

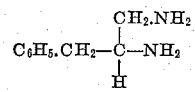

is distilled under reduced pressure. It distills at a temperature of 140–142° C. under a pressure of 20 mm. Its dihydrochloride melts at 254–255° C.

2. 16.1 grams of phenylacetylamino-benzyl-cyanacetic acid methyl ester are dissolved in 10 times that quantity of isopropyl alcohol, and the solution is hydrogenated at 100° C. with Raney nickel in a preheated bomb. The hydrogenation product is then freed from nickel, the isopropyl alcohol is removed by distillation, and the residue is dissolved in dilute hydrochloric acid. A small amount of undissolved matter is removed by filtration, and the acid solution is rendered alkaline by means of sodium carbonate solution. The separated base is isolated, and boiled for about 3-4 hours with ten times its weight of hydrobromic acid of 46 per cent. strength until dissolution is complete. Water is then added, the mixture is extracted with ether, and the aqueous extract solution is evaporated under reduced pressure to a small volume, during which operation the dihydrobromide of the alpha-benzyl-alpha, beta-diamino-propionic acid of the formula:

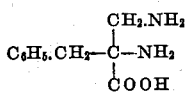

decomposing at 250° C., separates.

3. 46.4 grams of phenylacetylamino-cynacetic acid methyl ester and 31 grams of para-methoxybenzyl chloride are added to a solution of 4.6 grams of sodium in 80 cc. of methyl alcohol. As soon as the reaction has subsided, the solution is boiled for a short period under reflux until it has a neutral reaction. Water is added, and the phenylacetylamino-para-methoxybenzyl-cyanacetic acid methyl ester is separated by filtering with suction. 74 grams of this product are hydrogenated as described in Example 2. By the further treatment described in Example 2 the dihydrobromine of alpha-(para-methoxybenzyl)-alpha, beta-diaminoproprionic acid of the formula

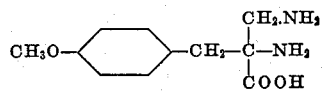

and decomposing at 258-259° C. is obtained.

I claim:

1. As a new product the alpha-benzyl-alpha, beta-diamino-propionic acid of the formula:

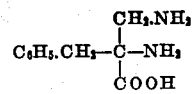

the dihydrobromide of which decomposes at 250° C.

2. As a new product the alpha-(para-methoxybenzyl)-alpha,beta-diaminopropionic acid of the formula:

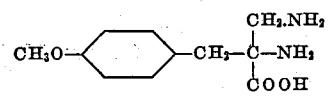

the dihydrobromide of which decomposes at 258-259° C.

3. Compounds of the following general formula:

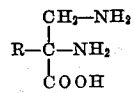

wherein R stands for an araliphatic radical.

GUSTAV EHRHART.

REFERENCES CITED

The following references are of record in the file of this patent:

UNITED STATES PATENTS

| Number | Name | Date |
|---|---|---|
| 2,365,295 | Schaaf et al. | Dec. 19, 1944 |
| 2,393,723 | Tullar | Jan. 29, 1946 |
| 2,479,662 | Albertson et al. | Aug. 23, 1949 |

OTHER REFERENCES

Hofmann, Beilstein (Handbuch, 4th ed.), vol. 4, page 257 (1922).

Jaeger et al., Chem. Abstracts, vol. 37, columns 621-622 (1943).